United States Patent [19]

Strauss, Jr. et al.

[11] Patent Number: 5,727,196
[45] Date of Patent: Mar. 10, 1998

[54] OPTIMIZED QUERY INTERFACE FOR DATABASE MANAGEMENT SYSTEMS

[75] Inventors: Irvin Richard Strauss, Jr., La Honda; Lam H. Thai, La Verne, both of Calif.

[73] Assignee: Borland International, Inc., Scotts Valley, Calif.

[21] Appl. No.: 888,991

[22] Filed: May 21, 1992

[51] Int. Cl.$^6$ .................................................. G06F 17/30
[52] U.S. Cl. ........................................................ 395/602
[58] Field of Search ................................. 395/600, 700

[56] References Cited

U.S. PATENT DOCUMENTS

| | | | |
|---|---|---|---|
| 4,811,199 | 3/1989 | Kuechler et al. | 395/600 |
| 5,204,958 | 4/1993 | Cheng et al. | 395/600 |
| 5,257,365 | 10/1993 | Powers et al. | 395/600 |
| 5,263,167 | 11/1993 | Conner, Jr. et al. | 395/700 |
| 5,265,244 | 11/1993 | Ghosh et al. | 395/600 |
| 5,265,246 | 11/1993 | Li et al. | 395/600 |

FOREIGN PATENT DOCUMENTS

WO 92/06440  4/1992  European Pat. Off.  ........ G06F 15/40

OTHER PUBLICATIONS

*Turbo Database Toolbox Owner's Handbook, Appendix B, B + Tree Structure*, pp. 131, Third Edition, Sep. 1985.
Freeland, R., *Exploring MDXs*, Data Based Advisor, Feb. 1991, pp. 85–87.
Baker, M., *B–tree indexing: A look at indexing tradeoffs in dBASE, Clipper, and FoxPro*, Programmer's Journal, vol. 8.6, Nov./Dec. 1990, pp. 42–46.

*Primary Examiner*—Wayne Amsbury
*Attorney, Agent, or Firm*—John A. Smart; Michael J. Ritter

[57] ABSTRACT

A database management system of the present invention includes a computer having a memory and a processor, a database for storing information in the memory as field values in a record, an indexing component for referencing a plurality of records by a value of the field(s), an input device for selecting desired records by entering a range of values corresponding to the field(s) (indexed on), and a component for accessing the desired records as an order set, where only records having a value within said range are included within the set. System and methods are also described for optimizing the access of information from the database management system.

6 Claims, 9 Drawing Sheets

Microfiche Appendix Included
(1 Microfiche, 46 Pages)

OPTIMIZED QUERY INTERFACE FOR DATABASE MANAGEMENT SYSTEMS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

This application includes a microfiche Appendix A consisting of 1 sheet and 46 frames and a microfiche Appendix B consisting of 1 sheet(s) and 46 frames.

BACKGROUND OF THE INVENTION

The present invention relates generally to the area of database management systems and, more particularly, optimized methods and system for querying information from those systems.

Computers are a powerful tool for the acquisition and processing of information. Of particular interest to the present invention are database management systems (DBMS), which can be regarded as a kind of electronic filing cabinet or repository for collecting computerized data files. As such, these systems serve to maintain information in database files or tables and make that information available on demand.

A database management system serves as a software cushion or layer between the physical database itself (i.e., the data actually stored on a storage device) and the users of the system, thus shielding of database users from underlying hardware-level details. In particular, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

Users of a database management system may be generally divided into application programmers and end users. Application programmers are those individuals responsible for writing application programs that use the database. These programs operate on the data to provide turn-key applications for retrieving existing information, inserting new information, deleting or changing existing information, and the like. In most systems, an application programmer must possess a certain degree of familiarity with the construction and operation of the DBMS, including data access and manipulation syntaxes supported by the DBMS.

End users, on the other hand, are individuals who interact with the system from an on-line terminal, or a standalone workstation or PC. A given end user typically accesses the database through one of the custom or turn-key applications mentioned above. Alternatively, he or she uses a built-in interface (e.g., Command Center of dBASE IV®), which is typically provided as a integral part of the database system software.

By using a built-in interface, the user may obtain information from the database without issuing explicit commands (e.g., SQL's SELECT command). Instead, the user directs the operation by choosing items from a menu or by filling in items on a query form. These menu or form-driven interfaces tend to be much easier to use for individuals who do not have formal training in data processing. Command-driven interfaces (i.e., data access languages), in contrast, tend to require a fair amount of data processing expertise, although perhaps not as much as that required to write an application program in a native programming language (e.g., in Cobol or C).

In a typical query operation, the user specifies which tables contain the information sought, which fields are to be displayed, which records are to be selected, and what calculations (if any) are to be performed. Query operations can be performed to find, change, add, or remove information. More particularly, the user can insert new records into a table, delete records from a table, change values in a field, and find records in a table. A user may ask several different types of questions from the DBMS. For example, a user can query a single table, or join two or more tables for a single query. In addition, the user can use queries to define groups and sets of information within his or her tables and to perform calculations and comparisons on those sets. All told, there is no limit to the complexity with which a query may be constructed.

One popular query interface is Query-by-example (QBE), which allows a user to ask questions and perform query operations by constructing simple examples. Instead of spending time figuring out how to perform the query, the user simply gives the system an example of the result he or she is looking for. In turn, the DBMS automatically determines how to get the answer or perform the operation. Since queries are interactive and iterative, they are highly flexible. If a query does not quite obtain the result the user wants, he or she can easily fine tune the query and perform it again. By constructing queries which build on each other, the user can play "what if" scenarios with his or her data.

Whether performed through a query interface or manually (i.e., command-line driven), the basic operation of a query centers around the definition of selection conditions. Selection conditions tell the DBMS which records the user wants included in the resulting view or answer table. Selection conditions are like filters or tests that select records based on entries in one or more fields. For instance, a simple selection condition could include "CA" in the state field of a query form; this condition instructs the DBMS to include only those records with the state field entry equal to "CA".

Selection conditions are entered in the fields of query forms. The position of the selection condition in the query form tells the system which field the user wants tested. Thus, when a user enters a selection condition in a last name field of a table, the system will test the entries in the last name field of a table against that condition. If an entry from the table passes the test (i.e., it satisfies the condition), then the record becomes part of the answer table; otherwise, it is excluded from the answer table.

Many types of selection conditions may be specified. The user can create, for example, selection conditions for alphanumeric, numeric, dollar, and date fields. In addition to specifying exact-match conditions (e.g., state="CA"), users may select records that have entries which fall within a certain range. This is particularly helpful when one is selecting records based on entries in numeric, dollar, or date fields. For example, a user may wish to locate all of the entries with a date which is less than (before) Jan. 1, 1992. Typically, a set of operators are provided for creating these queries; a typical set includes greater than, less than, greater than or equal to, or less than or equal to a stated value. In addition to these operators, conditions may be selected which require a matching record to meet either of two or more tests (logical OR), or conditions may be selected which require a record to meet all of two or more conditions (logical AND).

While prior art query interfaces provide a simplified means for users to access database information, the resulting queries are not necessarily easier for the DBMS to process. To the contrary, the task is usually more difficult as the database must determine a data retrieval approach or access path for completing the query operation. And often more than one access path exists. In this instance, it is desirable to choose the best or optimal path among the several available paths.

To date, attempts to optimize query operations have largely been confined to Structured Query Language (SQL) systems, typically running on mainframe or minicomputers. Based on the Relational Model of Dr. Codd, SQL is a set-based language and, hence, non-procedural in nature. SQL-based systems have the advantage of not requiring one to specify the procedural steps to satisfying a query. Largely because of their non-procedural nature, however, these systems have required some form of optimization for acceptable performance.

Despite the advantage found in SQL-based systems, many popular PC DBMS are based on record-navigation and direct access languages, such as dBASE®. Access in these procedural systems is closely tied to the physical structure of the database, i.e., one must know where the data file resides and what index file or tag to use to access it in a particular order. For example, the application programmer user of a procedural language-based database typically decides which approach or access path will be most efficient. Then, he or she specifies the series of low-level steps or commands necessary to produce the correct data from the query. Even those procedural systems which support non-procedural data access languages (e.g., SQL) must provide some mechanism for converting query statements into an executable or procedural form. All told, it is desirable to provide query optimization techniques for procedural environments as well.

Techniques for optimizing queries in a non-procedural environment are not necessarily helpful for optimizing procedural accesses. One known technique, for example, is pre-parsing of a query, i.e., reducing the user or application-provided query to an internal representation which is more easily processed by a system. Pre-parsing only accomplishes the initial parse of the query. It does not determine how the query will be answered by the database, however. Thus its benefit in procedural systems is not great.

Queries can also be optimized if the content of the query is known ahead of time. In that instance, the query is processed in advance, with the results stored for later use. Often, however, the query cannot be determined beforehand—the typical situation when a user employs a query interface. Thus, this optimization technique also has limited usefulness in procedural environments.

What is needed are system and methods for optimizing data access and query operations, particularly in those environments which are procedurally driven. Optimization should be provided even when the content of the query is not available in advance. The present invention fulfills this and other needs.

SUMMARY OF THE INVENTION

A database management system of the present invention includes a computer having a memory and a processor, a database for storing information in the memory as field values in a record, an indexing component for referencing a plurality of records by a value of the field(s), an input device for selecting desired records by entering a range of values ("key range") corresponding to the field(s) (indexed on), and a component for accessing the desired records as an order set, where only records having a value within said range are included within the set.

A preferred syntax is provided for entering a desired key range into the system. In an exemplary embodiment, a command of SET KEY TO RANGE x, y instructs the system to search for x, y and all values between x and y. On the other hand, the command SET KEY TO RANGE x instructs the system to search for x and all values larger (greater) than x; this may also be accomplished as SET KEY TO RANGE x,. The command SET KEY TO RANGE ,x instructs the system to search for x and all values smaller (less) than x, while the command SET KEY TO x instructs the system to search for x only. Finally, the command SET KEY TO simply turns off the key range.

Using the index range or SET KEY technique of the present invention, the system can go directly to the beginning of a set of records and work only with those records that belong within the set. By specifying a range of records to be considered in subsequent operations, users can quickly select many sets of records, while maintaining only a small number of indexes.

Methods for optimized data access for user queries are also described. In a preferred method of the present invention, the system looks for a pre-existing index satisfying the query condition, an index defining a range of records, the size of database, whether an index satisfying the query condition can be created, and, when the query condition specifies a range of information, whether an index defining the range can be created. From these observations, the system determines the best (optimal) data access path for satisfying a user query.

BRIEF DESCRIPTION OF THE DRAWINGS

FIG. 1D is a flowchart illustrating the operation of a SET KEY method of the present invention.

DETAILED DESCRIPTION OF A PREFERRED EMBODIMENT

System Components

Figure 1A:
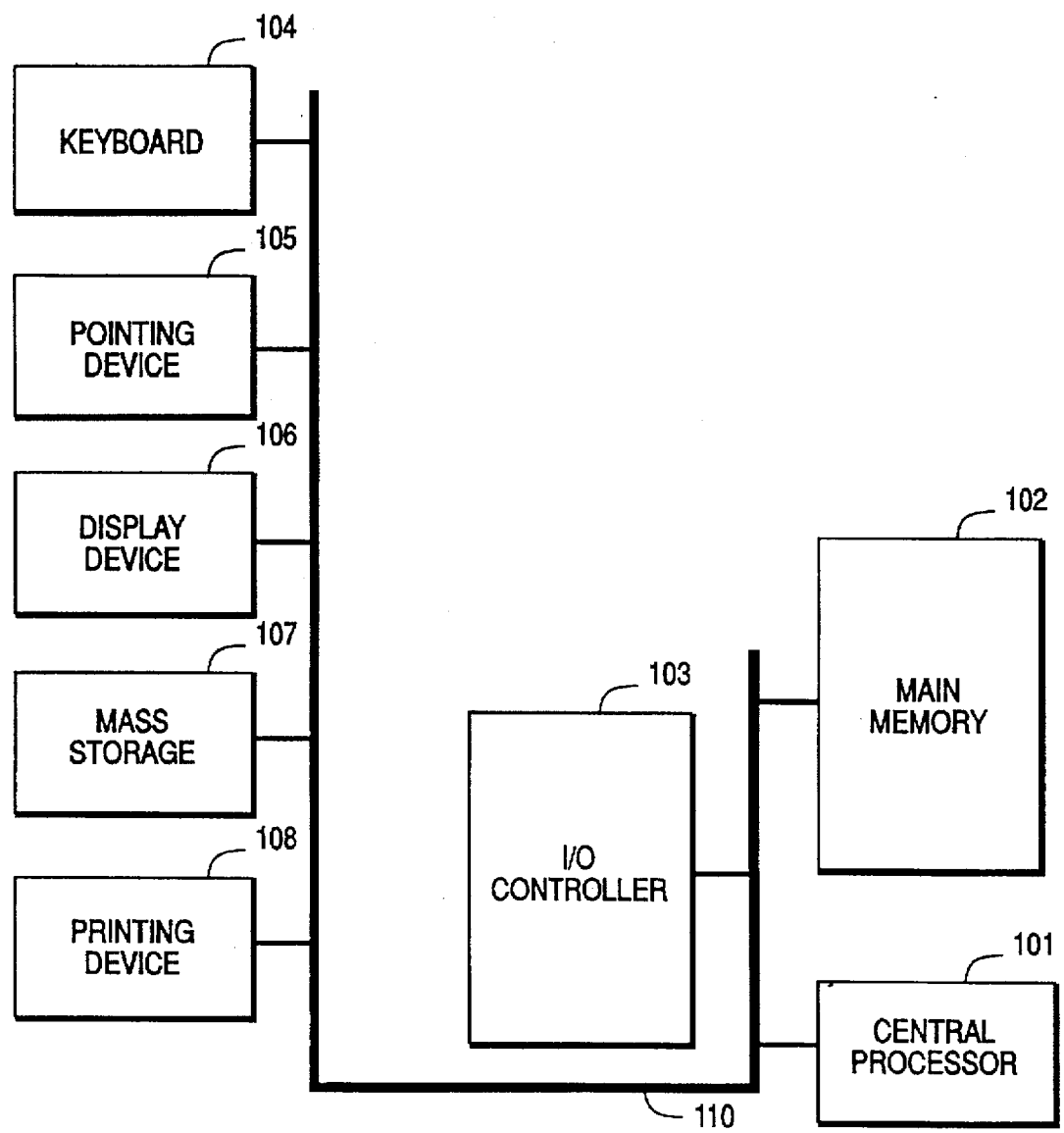
FIG. 1A is a block diagram illustrating a computer system in which the present invention may be embodied.

The present invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As shown, the various components of the system 100 communicate through a system bus 110 or similar architecture.

Figure 1B:
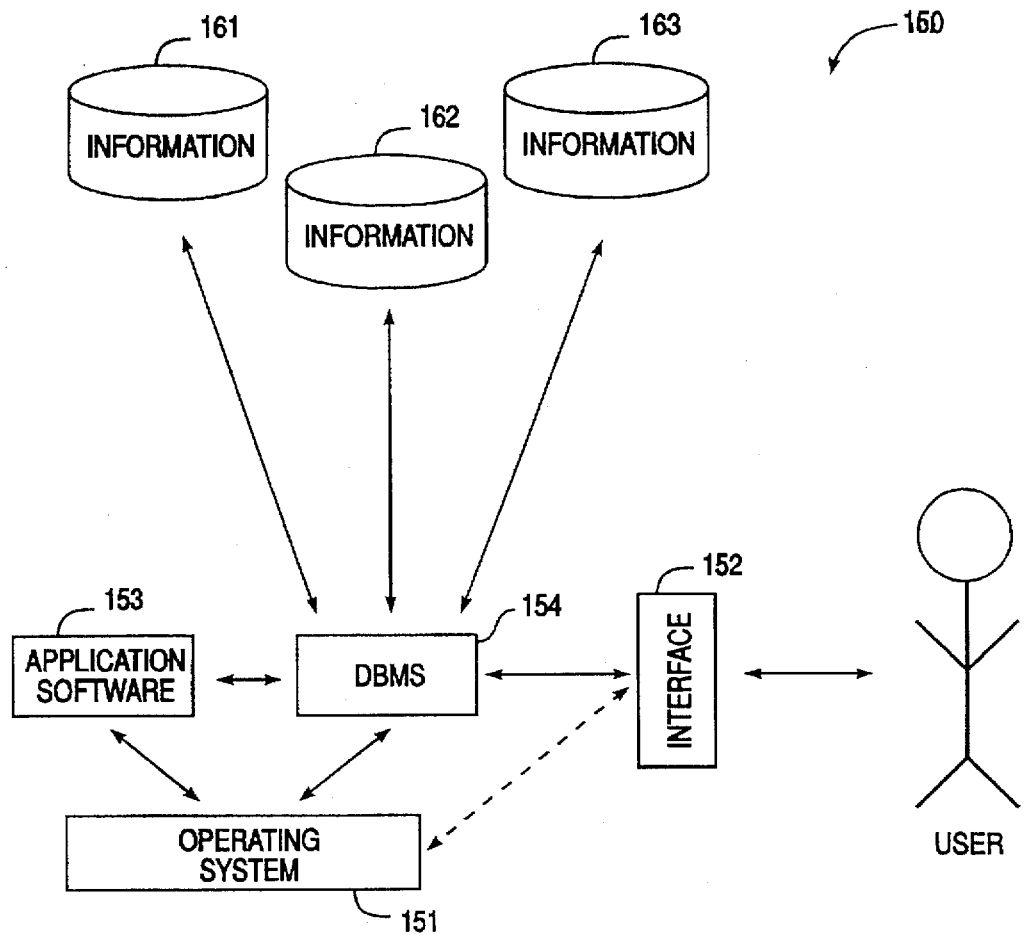
FIG. 1B is a block diagram of a software system for controlling the operation of the system of FIG. 1A.

Illustrated in FIG. 1B, a computer software system 150 is provided for programming the operation of the computer system 100. Software system 150, which is stored in system memory 102 and on disk memory 107, includes a kernel or operating system 151 and a DBMS 154. OS 151 is the executive or supervisor for the system 100, directing both task management and data management.

DBMS 154, on the other hand, is a software subsystem for storing, retrieving, and manipulating information in database tables (e.g., tables 161, 162, 163). Under the command of DBMS 154, the system 100 receives user commands and data through user interface 152. Interface 152 includes a built-in query surface or editor for accessing and processing database information. Additional application programs, such as DBMS application software 153, may be "loaded" (i.e., transferred from storage 107 into memory 102) for execution by the system 100, particularly for further controlling the operation of DBMS 154.

In a preferred embodiment, the system 100 is an IBM-compatible personal computer, available from a variety of vendors (including IBM of Armonk, N.Y.), and operating system 151 is MS-DOS, available from Microsoft of Redmond, Wash. DBMS 154 is preferably dBASE IV®, ver. 1.5 (available from Borland International of Scotts Valley, Calif.) and includes as interface 152 dBASE's Command Control and QBE query surface.

Figure 1C:
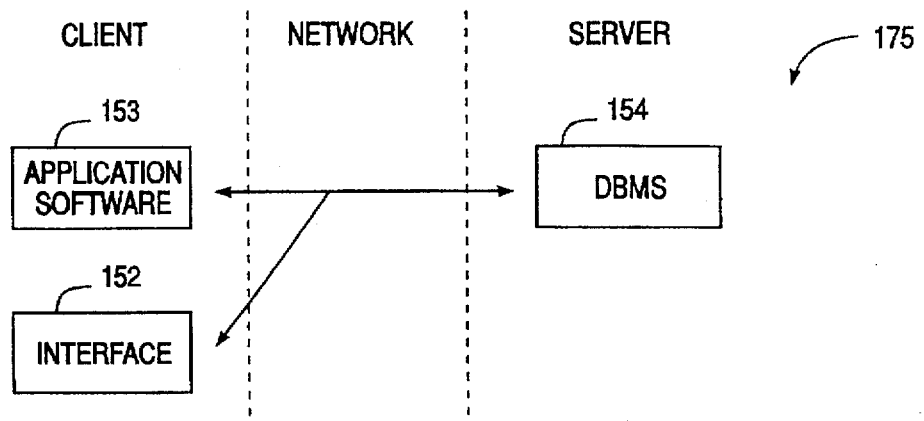
FIG. 1C is a block diagram of an alternative software system, one suitable for use in a networking (e.g., client/server) environment.
Figure 10:
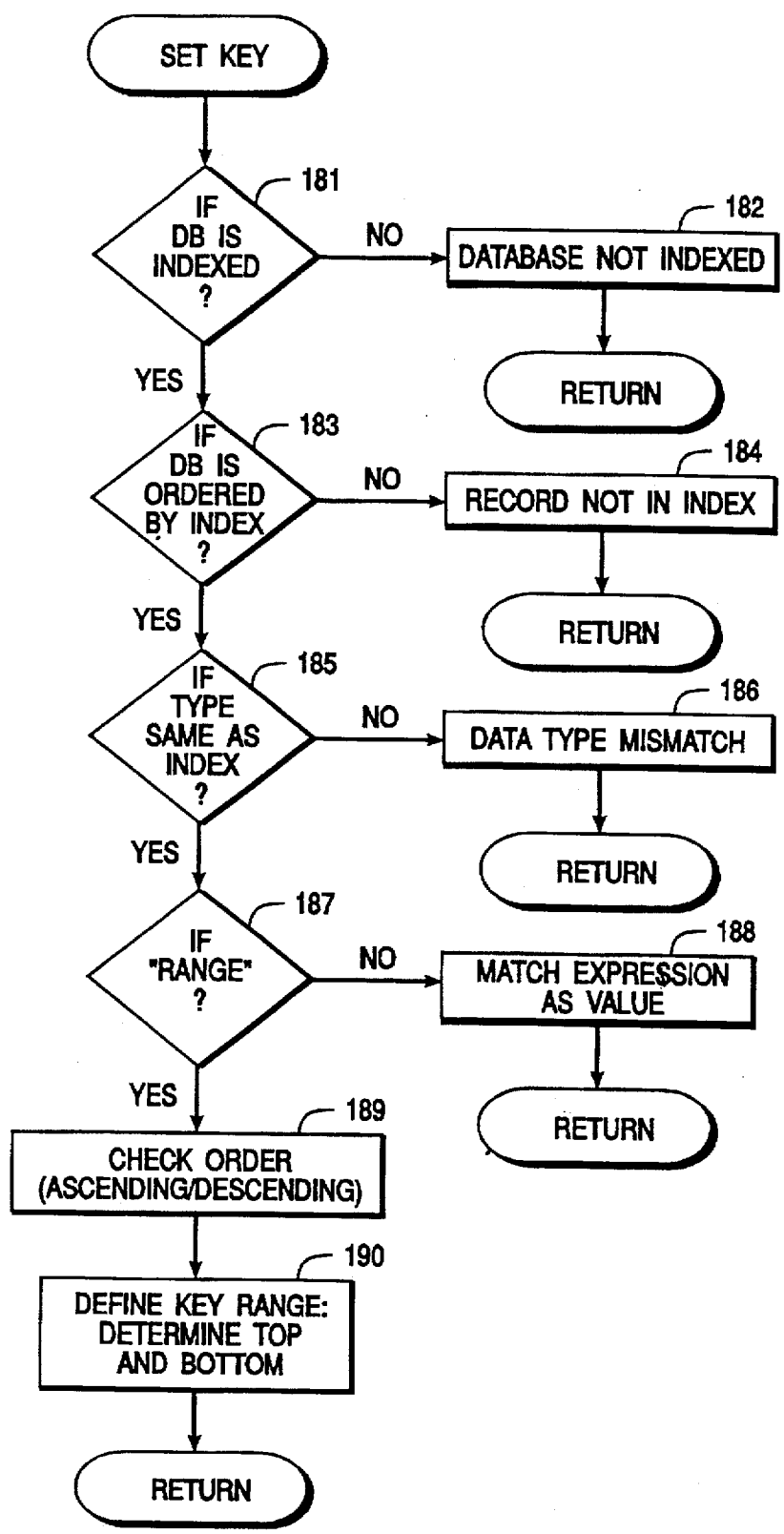

If desired, other operating systems and/or DBMS (or alternative configurations thereof) may be employed in accordance with the principles of the present invention. In FIG. 1C, for example, a system 175 includes the DBMS 154 operating as a database server (e.g., network or LANS server). In this instance, interface 152 and application software 153 resides locally, i.e., at a terminal of an end user (client).

Data Access Paths

The following description will focus on implementation of the present invention on the dBASE® DBMS platform, with data access techniques illustrated in dBASE IV® command language; a description of the dBASE® system and programming language is included herewith as microfiche Appendix B. However, the present invention is not limited to any particular environment or platform. Instead, the system and methods of the present invention may be advantageously applied to a variety of different environments.

According to the present invention, several methods are provided for selecting information of interest to the user. For convenience, information may be viewed as rows (tuples) in a database table or simply "records". In an exemplary embodiment, methods for accessing desired records include:

| Method | Description |
| --- | --- |
| SET FILTER | The system filters the records that match the user's query condition. |
| INDEX . . . FOR | The system creates a new index whose FOR clause selects records that match the user's query condition. The new index is saved or discarded, depending on the setting of a KEEP SPEEDUP INDEXES option. |
| SET KEY | If the user's query condition qualifies as a key filter, the system uses a key range. |
| OPTIMIZED | The system chooses the best of the three filtering methods for the user's query. By default, this technique is employed if a user does not select a method. |

Each of these techniques will now be described in further detail.

A. Set Filter

Upon entering a condition, the user may simply want the system to filter or "screen" records on-the-fly, for example, as they are displayed. Using the SET FILTER method, the system accepts only those records of a database file which match the specified condition; those records which fail to match the condition are simply ignored, for the time being. A preferred syntax for the command includes:

SET FILTER TO [FILE<filename>/?][<condition>]

SET FILTER TO <conditions> sets up a filter based on a valid system expression. The condition can filter records in the active database file based on any allowed data types; for example, on a character field, SET FILTER TO Lastname= "Jones"; or on a date field, SET FILTER TO Departure=[Jan. 01, 1991]. For memo or BLOB field types, however, it may be desirable (e.g., for performance purposes) not to apply filters directly to these field types. Logical constructors can be added to filters, such as SET FILTER TO LASTNAME= "Jones" .AND. Departure [Jan. 01, 1991].

Filters are preferably not activated until after a record pointer (cursor) is moved within a file. Thus, one may activate a filter setting by simply executing a dBASE GO TOP or SKIP command to move the record pointer. A blank or NULL condition, i.e., simply "SET FILTER TO", deactivates or turns off any filter for the active database file. A SET FILTER TO FILE command, on the other hand, adds a filter (query) file to a dBASE catalog if one is open and active (i.e., the command SET CATALOG is ON).

In usage, SET FILTER applies only to the database file open in a work area where the command is issued. Therefore, the user can set a different filter condition for each open database file. All commands that require a database file to be in USE, such as AVERAGE, BROWSE, EDIT, and REPORT, can use conditions specified by SET FILTER.

For purposes of illustration, an exemplary usage of the command in dBASE syntax will now be shown. Suppose, for instance, that the user wants to filter a Transact database file for all records whose Date_trans field is on or after Mar. 20, 1987. The user would enter the commands:

Use Transact

SET FILTER TO Date_trans >= [03/20/87]

LIST

With displayed results, for example, of:

| Record # | Client_id | Order_id | Date_trans | Invoiced | Total_bill |
|---|---|---|---|---|---|
| 8 | L00001 | 87-112 | 03/20/87 | .T. | 700.00 |
| 9 | A00005 | 87-113 | 03/24/87 | .T. | 120.00 |
| 10 | B12000 | 87-114 | 03/30/87 | .F. | 450.00 |
| 11 | C00001 | 87-115 | 04/01/87 | .F. | 165.00 |
| 12 | A10025 | 87-116 | 04/10/87 | .F. | 1500.00 |

Preferably, specific record pointer positioning commands ignore the SET FILTER TO condition. Continuing with the preceding example:

```
. GOTO 3
TRANSACT
. DISPLAY
```

| Record# | Client_id | Order_id | Date_trans | Invoiced | Total_bill |
|---|---|---|---|---|---|
| 3 | C00002 | 87-107 | 02/12/87 | .T. | 1250.00 |

The SET FILTER technique has the advantage of not incurring overhead for creating an index. Since each record is examined as it is called up for display, however, the technique is typically not desired for displaying large amounts of information.

B. Index . . . For

Indexing is a technique which allows the user to organize large amounts of data in many different ways, depending on his or her needs. An index is typically constructed as a simple disk file which is referred to internally by the system for locating and displaying records in a database file. Specifically, an index reorganizes the records in a database file according to the values in one or more fields of interest. As such, an index may greatly speed up searches for information (queries).

An exemplary index file stores two types of information: 1) an index key and 2) unique record numbers. An index key includes field values that are used to organize the database file records. Unique record numbers, on the other hand, are pointers to the actual storage location of each record in the database file. In this manner, an index for a database file is similar to the index of a book, which lists subject keys and page numbers that point to where the actual information is located in the book.

Practically any field or combination of fields in a database may be used as the index key or expression. For example, the values of last name, state, or zip fields may be used as the key for listing records in a customer database file. The expression "last name+first name" may be employed as a key to index records first by last name values and, when these values are identical, by first name values. Some fields do not benefit from indexing, however. For example, logical or boolean fields do not have a significant distribution of possible values and, thus, are not appropriate as index keys.

In a preferred embodiment, conditional indexes and unique indexes are supported. Conditional indexes employ a FOR clause for specifying records that are to be included in the index. In this manner, the query interface may construct an index with a FOR clause which filters records to meet one or more conditions entered on the query form; for example, INDEX customer_table FOR state="CA". The FOR clause may be omitted, however, in which case the index is a simple index on one or more fields. Unique indexes, on the other hand, include only the first occurrence of a record that contains a particular index expression. Thus, a unique index may be employed to remove duplicate records from the file.

Regardless of type, indexes may be retained for future use (i.e., when the answer view is no longer active). The user may require the system to retain indexes, at least temporarily (i.e., current session), by setting a KEEP SPEEDUP INDEXES option.

The INDEX command of the present invention creates an index in which records from a database file are ordered alphabetically, chronologically, numerically, or the like. A preferred syntax includes:

```
INDEX ON <key expression> TO <.mdx filename>[UNIQUE]
  or
INDEX ON <key expression>
   TAG <tag name>[OF <.mdx filename>]
   [FOR <condition> [UNIQUE] [DESCENDING]
```

Default drive and current directory are assumed, unless the user specifies otherwise as part of the filename. If the user gives a filename without an extension, a default file extension is written, for example, .ndx (for dBASE III® index files) or .mdx (for dBASE IV® index files). If the user types only INDEX, i.e., without any other keywords or options, the system prompts the user for an index expression, which corresponds to the ON clause, and the destination, which corresponds to the TO clause. Without a FOR clause or the UNIQUE option, the index will by default contain all records. INDEXing occurs in ascending order by default, unless the user employs the DESCENDING option.

The index, which is written to disk as either an index file or as a tag in a multiple index file, contains the key values and the corresponding record number for each record in the database file. Thus, the physical order of the records in the original database file need not be changed by the INDEX command. In use, indexed database files allow a user to move the record pointer directly to the first record whose data matches an expression given with FIND or SEEK commands, or with the LOOKUP() or SEEK() functions (dBASE IV® commands and functions are described in *Language Reference* available from Borland, a copy of which is appended herewith). Movement of the record pointer in the database file is controlled by a user-selectable controlling index.

In a preferred embodiment, a multiple index file containing a plurality of index tags is provided; each tag can impose an index order on the database file. Tag names conveniently may follow the same rules as variable names; for example, they may be up to a predetermined length, begin with a letter, and may contain letters, numbers, and underscores. Multiple index files, including dBASE's .mdx files, have been described in the technical literature; see e.g., Freeland, R., *Exploring MDXs*, Data Based Advisor, February, 1991, pp 85–87.

Preferably, a production multiple index file (.mdx file) is opened whenever a database file of interest is USEd, with each database file open having one production .mdx file. The production multiple index file typically has the same name as the database file, but has an .mdx rather than a database table (.dbf) file extension. A flag in the database file header contains indicates the presence of a production .mdx file.

Once the user creates an index, it becomes the new controlling index, and records appear in the new index order. Changes to the controlling index are performed with SET INDEX or SET ORDER commands. Additional active indexes have no effect on record pointer movement, and are open only so they can be updated when data in their keys are changed in the database file. Whenever changes are made that affect the key, the associated index file is preferably open to log the changes; alternatively the index file is opened and REINDEXed.

When the user creates an ascending index, the key expression may be a single field or any valid command-language (e.g., dBASE) expression. The data type of the key expression determines whether records will be ordered chronologically (date expressions), numerically (numeric expressions), or in ASCII order (character expressions). When the key expression includes several fields, they will preferably be converted to the same data type. If desired, the user can use functions to convert fields to a matching type. In dBASE, for example, some of the functions most commonly used in creating index key expressions are STR(), SUBSTR(), CTOD(), DTOC(), DTOS(), YEAR(), MONTH(), DAY(), and VAL().

Using FOR <condition>, indexes only references the records that meet a specified condition. If no records meet the FOR condition, an empty tag is created and maintained. Using the UNIQUE option, on the other hand, is the same as issuing SET UNIQUE ON before an INDEX. When several records have the same value on the key field, only the first record encountered with that value is included in the index. Whenever the user REINDEX an index file that was created with UNIQUE, the file retains its UNIQUE status, regardless of whether SET UNIQUE is ON or OFF. By default, the system processes UNIQUE indexes only once. Therefore, a previously hidden key value is not automatically updated when it is changed. REINDEX explicitly updates all key values in a UNIQUE index.

DESCENDING builds an .mdx tag in descending numeric order. For simplification, the DESCENDING option only refer to the entire index expression, not to one element in the expression, such as a field.

Exemplary uses of indexes will now be illustrated. The Transact database file may be indexed by Client_id:

```
. USE Transact
. INDEX ON Client_id TO Cus_id
100% indexed      12 records indexed
. LIST
```

With the listed results:

| Record # | Client_id | Order_id | Date_trans | Invoiced | Total_bill |
|---|---|---|---|---|---|
| 9 | A00005 | 87-113 | 03/24/87 | .T. | 125.00 |
| 1 | A10025 | 87-105 | 02/03/87 | .T. | 1850.00 |
| 12 | A10025 | 87-116 | 04/10/87 | .F. | 1500.00 |
| 10 | B12000 | 87-114 | 03/30/87 | .F. | 450.00 |
| 2 | C00001 | 87-106 | 02/10/87 | .T. | 1200.00 |
| . | | | | | |
| 7 | L00002 | 87-111 | 03/11/87 | .F. | 1000.00 |

To index a file so that it is ordered on client identifications and the amount of their transactions, the following is entered:

```
. INDEX ON Client_id + STR(Total_bill,10,2) TO By_amnt
100% indexed      12 Records indexed
. LIST
```

| Record # | Client_id | Order_id | Date_trans | Invoiced | Total_bill |
|---|---|---|---|---|---|
| 9 | A00005 | 87-113 | 03/24/87 | .T. | 125.00 |
| 12 | A10025 | 87-116 | 04/10/87 | .F. | 1500.00 |
| 1 | A10025 | 87-105 | 02/03/87 | .T. | 1850.00 |
| 10 | B12000 | 87-114 | 03/30/87 | .F. | 450.00 |
| 11 | C00001 | 87-115 | 04/01/87 | .F. | 165.00 |
| . | | | | | |
| 7 | L00002 | 87-111 | 03/11/87 | .F. | 1000.00 |

If the user want an alphabetical list of all Client_ids, one uses the UNIQUE option:

```
. INDEX ON Client_id TO Clients UNIQUE
100% indexed      7 Records indexed
. LIST Client_id
```

| Record # | Client_id |
|---|---|
| 9 | A00005 |
| 1 | A10025 |
| 10 | B12000 |
| 2 | C00001 |
| 3 | C00002 |
| 5 | L00001 |
| 7 | L00002 |

To create a conditional index containing only records with a total bill of $1,000 or more:

```
. INDEX ON Client_id TAG Large FOR Total_bill >= 1000
100% indexed      6 Records indexed
. LIST
```

| Record # | Client_id | Order_id | Date_trans | Invoiced | Total_bil |
|---|---|---|---|---|---|
| 1 | A10025 | 87-105 | 02/03/87 | .T. | 1850.00 |
| 12 | A10025 | 87-116 | 04/10/87 | .F. | 1500.00 |
| 2 | C00001 | 87-106 | 02/10/87 | .T. | 1200.00 |
| 4 | C00001 | 87-108 | 02/23/87 | .T. | 1250.00 |
| 3 | C00002 | 87-107 | 02/12/87 | .T. | 1250.00 |
| 7 | L00002 | 87-111 | 03/11/87 | .F. | 1000.00 |

To create an index TAG of Transact in reverse chronological order:

```
. INDEX ON Date_trans TAG Recent Descending
100% indexed      12 Records indexed
. LIST
```

| Record # | Client_id | Order_id | Date_trans | Invoiced | Total_bil |
|---|---|---|---|---|---|
| 12 | A10025 | 87-116 | 04/10/87 | .F. | 1500.00 |
| 11 | C00001 | 87-115 | 04/01/87 | .F. | 165.00 |
| 10 | B12000 | 87-114 | 03/30/87 | .F. | 450.00 |
| 9 | A00005 | 87-113 | 03/24/87 | .T. | 125.00 |
| 8 | L00001 | 87-112 | 03/20/87 | .T. | 700.00 |
| . | | | | | |
| 1 | A10025 | 87-105 | 02/03/87 | .T. | 1850.00 |

Creating and using an index has advantages over sorting (physically reordering a database file). For example, an index file takes up less disk space than a sorted database file, because an index file contains only the values of one or more fields of a database file rather than entire records. Since index files are typically smaller, a DBMS can use an index to organize a database faster than it can create a new, sorted file. Moreover, a number of indexes for organizing a database file may be created without storing a lot of redundant data. Finally, maintaining data in one indexed file rather than several sorted files promotes data integrity since there is only one version of the data.

Additional information describing indexes may be found in Appendix B: 1) *Getting Started*: a) Finding and Arranging Data (Chapter 11), b) Organizing Data (Chapter 15); 2) *Using The System*: Organizing Your Data (Chapter 5); 3) *Programming in The System*: Ordering the Database File (Chapter 9); and 4) *Language Reference*.

C. Set Key

The SET KEY command of the present invention allows the display of only those records of a database file whose ordering index key meets a specified range of conditions. The SET KEY TO <RANGE> command is similar to SET FILTER, but takes advantage of the controlling index instead to determine more quickly a range of records. This is accomplished without having to reindex whenever the range changes (as in the INDEX ... FOR command). Thus, this is useful when the filter defines a range or set of records, as defined by the active index, rather than individual records scattered throughout the database.

Thus, the SET KEY command directs the query interface to use a key range. Only certain conditions are candidates for use with the key range, most notably conditions which yield a range of values; for example, INCOME>$30,000 AND <$50,000. If the condition to be met does not satisfy the requirements of a key range, however, then the query interface typically will employ the INDEX ... FOR technique instead (as described herein below). A preferred syntax for SET KEY includes:

```
SET KEY TO [<exp:match>/RANGE<exp:low>,<exp:high>/
    <exp:low>[,]/, <exp:high>] [IN<alias>]
```

By default, SET KEY TO deactivates a current specified range. In usage, SET KEY preferably requires that a database be in USE with an INDEX. Data types of <exp:match>, <exp:low>, and <exp:high> should be the same as the data type of the controlling index key. In response, SET KEY looks for matches within the controlling index key according to the specified criteria.

Exemplary uses of SET KEY include:

1. SET KEY TO <exp:match> searches for an exact match.
2. SET KEY TO RANGE <exp:low> searches the index for values equal to or greater than <exp:low>.
3. SET KEY TO RANGE <exp:low>, is the same as SET KEY TO RANGE <exp:match>.
4. SET KEY TO RANGE , <exp:high> searches the index for values equal to or less than <exp:high>.
5. SET KEY TO RANGE <exp:low>, <exp:high> searches the index for all values equal to or greater than <exp:low> and all values equal to or less than <exp:high>.

The range established by SET KEY preferably takes immediate effect. To change the range, therefore, the user reissues the command with new parameters. The SET KEY command does not affect the operation of record updating or the index key itself, however. If the controlling index is discarded, the range determined by SET KEY is likewise lost. In selecting records for display, SET KEY has priority over SET FILTER. SET FILTER only works on the set of records that meet the criteria of SET KEY.

SET KEY, since it employs a range, has distinct advantages over other filtering and indexing methods. For example, to see all the records of people with Zip codes between 91104 and 91110 using SET FILTER, a user might enter:

```
USE People
INDEX ON Zip TAG Zip
SET FILTER TO Zip >= "91104" .AND. ZIP <= "91110"
BROWSE
```

In this approach, the system checks all the records to see whether they matched the SET FILTER condition. On a large database file, this takes a significant amount of time.

With conditional indexes, a user is able to use the FOR clause in indexes to achieve the same result, for example by entering:

```
USE PEOPLE
INDEX ON ZIP FOR Zip >="91104" .AND. ZIP <= "91110"
BROWSE
```

If users always want the same FOR condition, this technique yields good results, but it still takes time and disk space to build and keep indexes for other FOR conditions. Finding the people with a different range of Zip codes requires making another index.

Using the SET KEY index of the present invention, however, the system can go directly to the beginning of a set of records and work only with those records that belong within the set. By specifying a range of records to be considered in subsequent operations, users can quickly select many sets of records, while maintaining only a small number of indexes. Thus, the above example is rewritten as follows:

```
USE PEOPLE
INDEX ON Zip TAG Zip
SET KEY TO RANGE "91104", "91110"
BROWSE
```

The system uses the index to find the first record in the range and calculates the last record in the range, thus defining a key range from 91104 to 91110. The user is free to operate on this set of records. The system does not needs to search through the other records or build an index with a FOR clause—it merely examines the existing index. Because the index already groups all the matching records together, this approach saves a lot of time.

Referring now the FIG. 1D, a SET KEY method 180 of the present invention is illustrated by a flowchart. SET KEY acts as a filter on the key expressions that are stored in the index, rather than on the underlying data. Thus, the matching value (or range of values) serves as a "key filter". To evaluate a key filter, the method first checks in step 181 to determine if the database has been indexed, i.e., if the database is opened with a companion .ndx or mdx file (e.g., by SET INDEX TO). If not, then an error code ("Database not indexed") is returned at step 182. Next in step 183, the method checks whether the database in use is ordered by an index (e.g., by SET ORDER TO). If not, then an error code ("Record not in index") is returned at step 184. In addition to error codes, the method may simply request the desired action from the user. Otherwise (yes at step 183), the method continues on to step 185 to determine that the data type of the command expression matches the type of the key expression for the controlling index. If they do not match, an error code ("Data type mismatch") is returned at step 186; alternatively, data types may be normalized to a standard type (e.g., character or text strings). Otherwise (yes at step 185), all preliminary checks have been completed.

Continuing on to step 187, the method checks if the match expression <exp:match> is entered without the "RANGE" keyword. If the keyword has not been entered, the expression then becomes the value that must be matched in order for a record to be selected, as shown by step 188. If the RANGE keyword is used (yes at step 187), along with expressions for low and high range expressions (<exp:low> and <exp:high>), the system examines whether the records are in ascending or descending order at step 189. At step 190, the system defines the key range from the expressions by determining which one should be the bottom and which one the top.

The method also accommodates match expressions which are defined only at one end of a range. If, for example, the match expression only contains the lower boundary <exp:low>, then the method may search for <exp:low> and all values larger than it. If, on the other hand, only the upper boundary <exp:high> is entered (e.g., SET KEY TO RANGE, 5000), then the method may search for <exp:high> and all values smaller than it.

System 100 also evaluates the range limits after each record is changed, and (if necessary) revises which records mark the upper and lower boundaries. Thus while SET KEY is active, if a value included in the controlling index's key expression is changed, the record's key expression is reevaluated to make sure it still fits within the range of acceptable values for the key expression.

For example, from the commands

```
USE Employee ORDER Salary
SET KEY TO RANGE 30000, 50000
REPLACE ALL Salary WITH Salary*1.10
LIST Lastname, Salary
``` the following results:

1. All employees with salaries between $30,000 and $50,000 are given a 10% raise (REPLACE).
2. The lastnames and salaries are then listed for those employees who STILL have salaries between $30,000 and $50,000 (LIST).

If an employee started with a salary of $48,000, and received a raise of 10%, that employee would then have a salary of $52,800. Since this salary is higher than the range established for SET KEY, that person's record would no longer be part of the active set of records and so would not be displayed by the LIST command.

A key filter is typically static, i.e., once it is established by SET KEY, it does not change dynamically. In other words, if values used in <exp:match>, <exp:low>, or <exp:high> change after a key filter has been established, they do not change the key range. To establish a new range, the command should preferably be reissued.

An optional IN<exp:WA> clause may be used to set a key filter in a specific work area. Each open database file can have a separate key filter. If the IN <exp:WA> clause is omitted, the key filter will be established in the current work area. When a database file with a key filter is closed, the key filter is preferably discarded. A key range may also be discarded whenever the active index is closed or a new index order is specified. SET KEY does not affect the indexes themselves, however. As records are changed or appended to the database file, the indexes are maintained, even if the new or changed records are not in the key range.

The syntaxes of SET KEY and its behavior may be summarized as follows:

| | |
|---|---|
| SET KEY TO | && shut off the key range |
| SET KEY TO x | && search for x only |
| SET KEY TO RANGE x | && search for x and all values larger than x |
| SET KEY TO RANGE x, | && Same as "SET KEY TO RANGE x" |
| SET KEY TO RANGE ,x | && search for x and all values smaller than x |
| SET KEY TO RANGE x, y | && search for x, y and all values in between |

"SET KEY TO RANGE x, x" is equivalent to "SET KEY TO x". If the index order is changed, the established key range will shut off. New key range for the new index order should be re-established if necessary.

To set up a different key filter, users merely issue another SET KEY command. No new indexing is required. If the user omits the second range value, the system selects the set of records that match the first value. For example, if the user enters . . .

SET KEY TO "91104"

The selected set is only those records whose Zip code matches 91104.

SET KEY can also be combined with complex or INDEX . . . FOR indexes. For example, users can use a complex index and SET KEY to find all the records that satisfy the following condition:

LEFT (Firstname, 1)+Lastname="GBush"

First, a Firstinit index could be created . . .

INDEX ON LEFT(Firstname, 1)+Lastname TAG Firstinit

Then, set the key range:

SET KEY TO "GBush"

The same Firstinit index could may now be used to find other records by first initial and last name, merely by changing the value used in the SET KEY command.

In a like manner, the SET KEY command is also useful when combined with the SET FILTER command. The record set of SET FILTER is a subset of the record set of SET KEY. The system first finds the range with SET KEY, then applies the SET FILTER, only to those records that fall inside the key range. For example, in:

```
USE Employee ORDER Zip
SET FILTER TO Lastname="Smith"
SET KEY TO RANGE "91101", "91111"
``` the system first identifies the range of records that satisfy the Zip key filter. Then only those records that fall in this range are checked to see whether their last name field contains "Smith". This is faster than checking every record to see if the last name field contains "Smith".

In the example:

```
USE Employee ORDER Lastname
SET FILTER TO Lastname>"Mason" .OR.
   Lastname<"Wallace"
SET KEY TO "Jones", "Smith"
``` both SET FILTER and SET KEY specify ranges on the same field. The result of such a situation is the intersection of the ranges. In this case, the qualifying last names would be greater than "Mason" but less than or equal to "Smith"

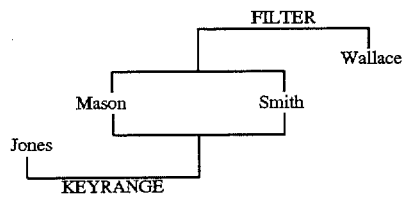

Since key filters and filters operate independently of each other, a user can close a key filter (e.g., with SET KEY TO) without closing an existing filter established by SET FILTER.

For equivalent situations, SET KEY also interacts with SET NEAR, SET EXACT, SEEK, FIND, and the like in the same manner that it interacts with SET FILTER. Equivalent situations include, for example:

```
        USE Employee ORDER Lastname
        SET FILTER To Lastname="Smith"
        USE Employee ORDER Lastname
        SET KEY TO "Smith"
or:
        USE Employee ORDER Lastname
        SET FILTER TO Lastname<="Smith" .AND.
           Lastname>="Wells"
        USE Employee ORDER Lastname
        SET KEY TO RANGE "Smith", "Wells"
```

The behavior of SET KEY with SET NEAR, SET EXACT, and SEEK may be illustrated by the following pseudo dot prompt (command-driven) session; comments about the behavior are shown to the right of the code.

```
. USE EMPLOYEE ORDER Lastname
Master index: LASTNAME
. LIST Lastname
    Record#  lastname
       1  Beman
       2  DeBello
       3  Drendon
       4  Eivera
       5  Gelson
       6  Hamby
       7  Kotky
       8  Larson
       9  Long
      10  Lucas
      11  Michaels
      12  Orlando
      13  Peterson
      14  Plimpton
      15  Pope
      16  Rizzo
      17  Sanders
      18  Young
      19  Youngblood
. SET EXACT OFF
. SET NEAR OFF
. SEEK "Petersonville"
Find not successful   <-- EXACT=OFF and names not a close match
. SEEK "Peters"
. ? RECNO( )          <-- EXACT=OFF and names are close match
   13
. ? Lastname
Peterson
. SET EXACT ON
. SEEK "Peters"
Find not successful   <-- EXACT=ON exact match required
. ? EOF( )            <-- NEAR=OFF pointer lands at EOF
.T.
. SET NEAR ON
. SEEK "Peters"
```

```
Find not successful   <-- EXACT=ON  exact match required
. ? RECNO( )          <-- NEAR=ON   pointer lands at next record
   13
. ? Lastname
Peterson
. COUNT
   19 records
. SET KEY TO "Peterson"
. LIST Lastname
    Record#  Lastname
      13  Peterson      <-- SET KEY affects records acted upon
. COUNT
   1 record
. SEEK "Peters"
Find not successful   <-- EXACT=ON  close match still not OK
. ? RECNO( )          <-- NEAR=ON   still land at next record
   13                              IF the record fits filter
. ? Lastname
Peterson
. SEEK "Plimp"
Find not successful   <-- EXACT=ON  close match still not OK
. ? EOF( )            <=NEAR=ON    NEAR cannot land, since
.T.                                next record not in FILTER
. SEEK "Plimpton"
Find not successful   <-- SET KEY hides even an exact match
. ? EOF( )            <-- NEAR=ON   NEAR cannot land, since
.T.                                 record is not in FILTER
. SET KEY TO
. SEEK "Plimpton"     <-- Without SET KEY, exact match found
. ? Lastname
Plimpton
```

These interactions with SET KEY, SET NEAR, SET EXACT, SEEK, and FIND may be summarized as follows:

1. Any match (close or exact) to a record not in the key filter will be unsuccessful and place the record pointer at end of file (EOF), regardless of how EXACT is set.

2. If . . .

```
NEAR is ON
SET KEY is active
A FIND or SEEK is unsuccessful
```

Then the record pointer lands on the next closest record, if that record is inside the filter.

3. If . . .

```
NEAR is OFF
SET KEY is active
A FIND or SEEK is unsuccessful
```

Then the record pointer lands at EOF.

Error conditions for SET KEY are reported as follows. If the database file in the specified work area has no indexes, SET KEY returns error message: Database not indexed. If the database file in the specified work area has one or more indexes, but is in natural order, SET KEY returns error: Record not in index. If the data types of <exp:range1>, <exp:range2>, and the key expression of the controlling index do not all match, SET KEY is halted and users get the error message: Data type mismatch. If both <exp:low> and <exp:high> are specified and the value of <exp:low> is higher or larger than that of <exp:high>, SET KEY returns the error: Lower limit is larger than upper limit.

If SET KEY usage does not adhere to the specified syntax, the error "Syntax error" will occur during compilation. For example, a syntax error would occur when:

| | |
|---|---|
| SET KEY TO x, y | Missing keyword RANGE |
| SET KEY TO RANGE | Missing range values |

In the second example, the user may intend to execute "SET KEY TO" with a memory variable named "RANGE". In the interest of helping users who really omitted the RANGE value, however, the compiler should not allow this situation. However, the following code is acceptable:

```
RANGE = 10
SET KEY TO RANGE RANGE => SET KEY TO RANGE 10
```

Optimized Query

The following description will focus on optimizing methods of the present invention operative within the context of a query surface. The methods of the present invention may, however, be advantageously employed in command-line fashion, as well. In that instance, the query will already be constructed by the user (or by application software) into the text equivalent of conditions which would have been enter into the query surface. While the command-line approach simplifies system design, it requires the user to know minimum query commands. Thus, the presently preferred embodiment of the present invention employs a query or QBE interface.

A. General query operation

Figure 2:
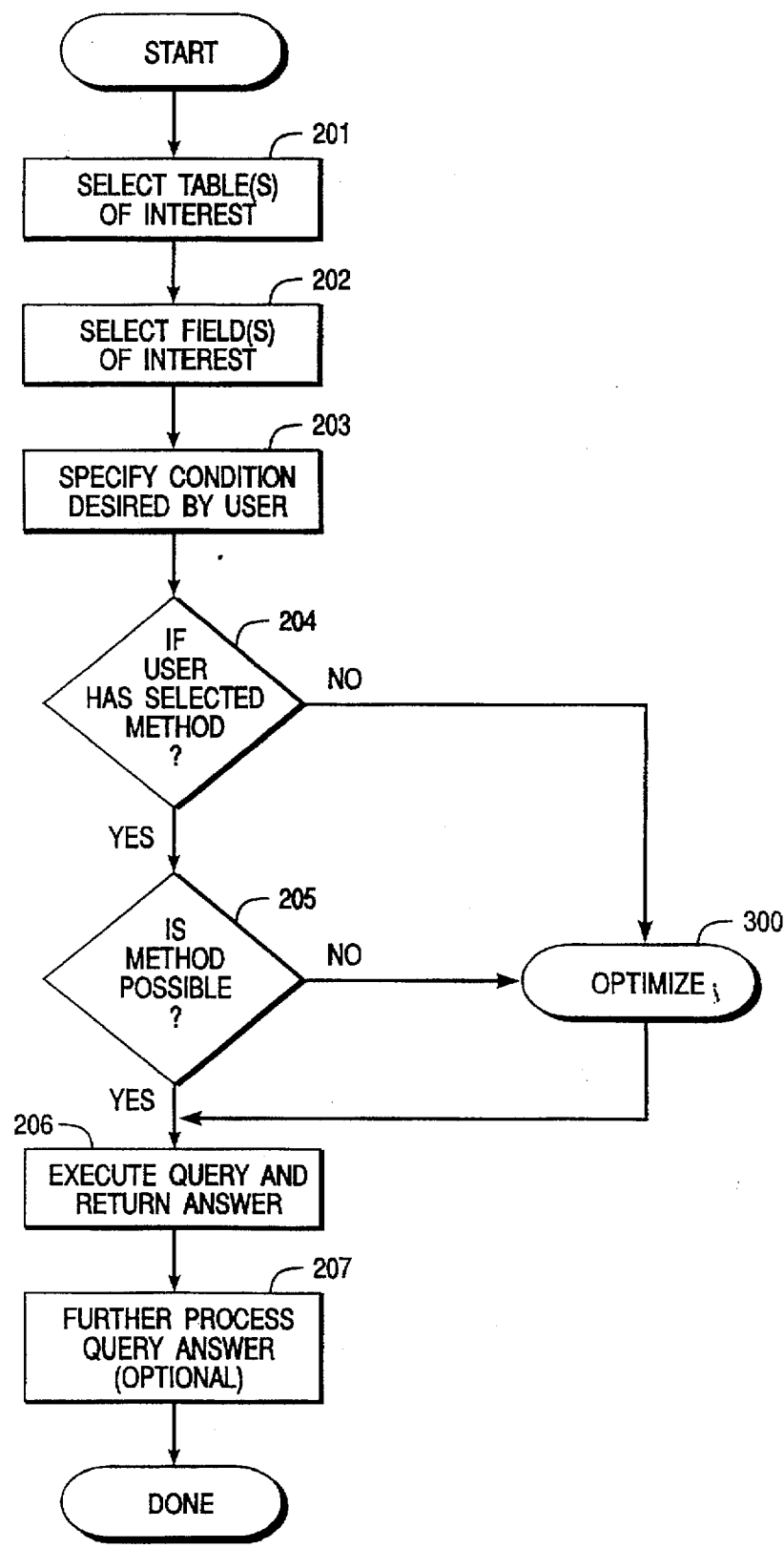
FIG. 2 is a flowchart illustrating an overall method incorporating query optimization, in accordance with the present invention.

Referring now to FIG. 2, a method of the present invention for the querying of information is illustrated. The method begins from the query interface where, in step 201, the user selects one or more tables (information) of interest. In a preferred method, the desired table(s) may be selected from a displayed submenu of tables. A query form or "file skeleton," illustrating fields of the respective tables, is displayed on the query surface for each table selected.

Next, the user selects desired fields and enters desired conditions, as follows. In step 202, the user selects one or more fields of interest from the displayed tables (i.e., database fields). For example, the user may place a check mark (press a pre-determined key) within each desired field as it is displayed in its corresponding file skeleton. In step 203, the user specifies conditions, such as matching values or ranges of values, in appropriate fields; this step is analogous to writing, for example, a WHERE clause in SQL. In typical operation, the user moves a screen cursor to the field or column of a file skeleton where a condition is desired. Query operators, including =, >, <, and the like, are available; also, conditions can be specified which refer to other columns in the table. As many conditions as desired may be entered, each of which may be logically connected with AND and OR operators.

If multiple tables are to be queried, each pair of tables is linked by a common field. Linking may be accomplished using known techniques, including example or model elements, drawing links with a screen cursor, or the like.

In step 204, the method determines whether the user desires a particular query method. On occasion, a user (particularly experienced ones) will know when he or she wants the query interface to use a certain condition to select records. For example, if about ninety-five percent of the records match the condition, and there are many records in the table, the user will probably prefer a simple filtering technique. On the other hand, the user may know that most of the records satisfying the condition are at the bottom of a large database file. In this instance, simply filtering would not be a good choice. Thus in a preferred method of querying information, users have the option of selecting the particular query method employed.

If the user has no preferred access method, then the system will, by default, choose to optimize the query (in step 300). If the user has selected a particular query method (yes at step 204), however, then a test is made at step 205 to determine if the user-specified method is in fact possible. If the method is not possible or feasible, then the query method 200 will optimize the query (by branching to step 300).

At step 206, the query is executed and an answer (view) returned. If the user has selected a valid method (yes at steps 204 and 205), then step 206 executes according to the user-specified method. Otherwise (no at these steps), the system executes according to the query method returned by the optimizer of the present invention. At step 207, the query may be further processed, such as refining selection conditions or performing operations upon the answer table (e.g., joining with other tables). After this step, the method concludes.

B. Optimized data access

1. Data access paths and syntaxes

The optimum choice for a query depends on several factors, including:

1. Whether a useful index already exists;
2. The nature of the query condition;
3. The distribution of records throughout the database file; and
4. Whether the user plans to use the same condition in the future.

Each will be illustrated by an example. For factor 1, consider a situation where there is an index tag on the field that contains the query condition. For example, if the user has entered the query condition:

$$>="97219"$$

$$<="97401"$$

in the Zip field and there is an index tag on Zip, the user can use SET KEY.

For an example of factor 2, consider an instance where the user has entered the condition >"CA" in the State field. Here, INDEX ... FOR can be used, with the system creating an index with the clause: FOR State>"CA".

For factor 3, in the Zip example above, the zip codes 97401 and 97219 are grouped in a narrow range when records are indexed by Zip. In this instance, SET KEY is typically employed. However, if the query condition the user is entering is:

$$>="01060"$$

$$<="98102"$$

using SET FILTER would probably be more effective because the range is broad enough to include most of the records in the database.

Factors 1, 2, and 3 are determined by the system (query design surface), which analyzes the current indexes and the nature of data in the database files. Factor 4, on the other hand, is determined by analyzing the activities of the user. Using statistical and/or artificial intelligence (e.g., inference engine) techniques, for example, user activities may be tracked for determining whether the user will likely use the same or similar condition in the future. Alternatively, the user may be simply asked to specify whether the condition will be used in the future.

If desired, the user may manually select a data access method. If most of the records in a large database will match the query condition, using SET FILTER is probably more efficient than using INDEX . . . FOR, which checks each record for the FOR condition. If records matching the query condition occur in a certain range of records, SET KEY is probably more efficient than SET FILTER. If the user is not certain which of the methods is more efficient, however, he or she should select OPTIMIZED and let the system decide.

2. Optimization method

Figure 3A:
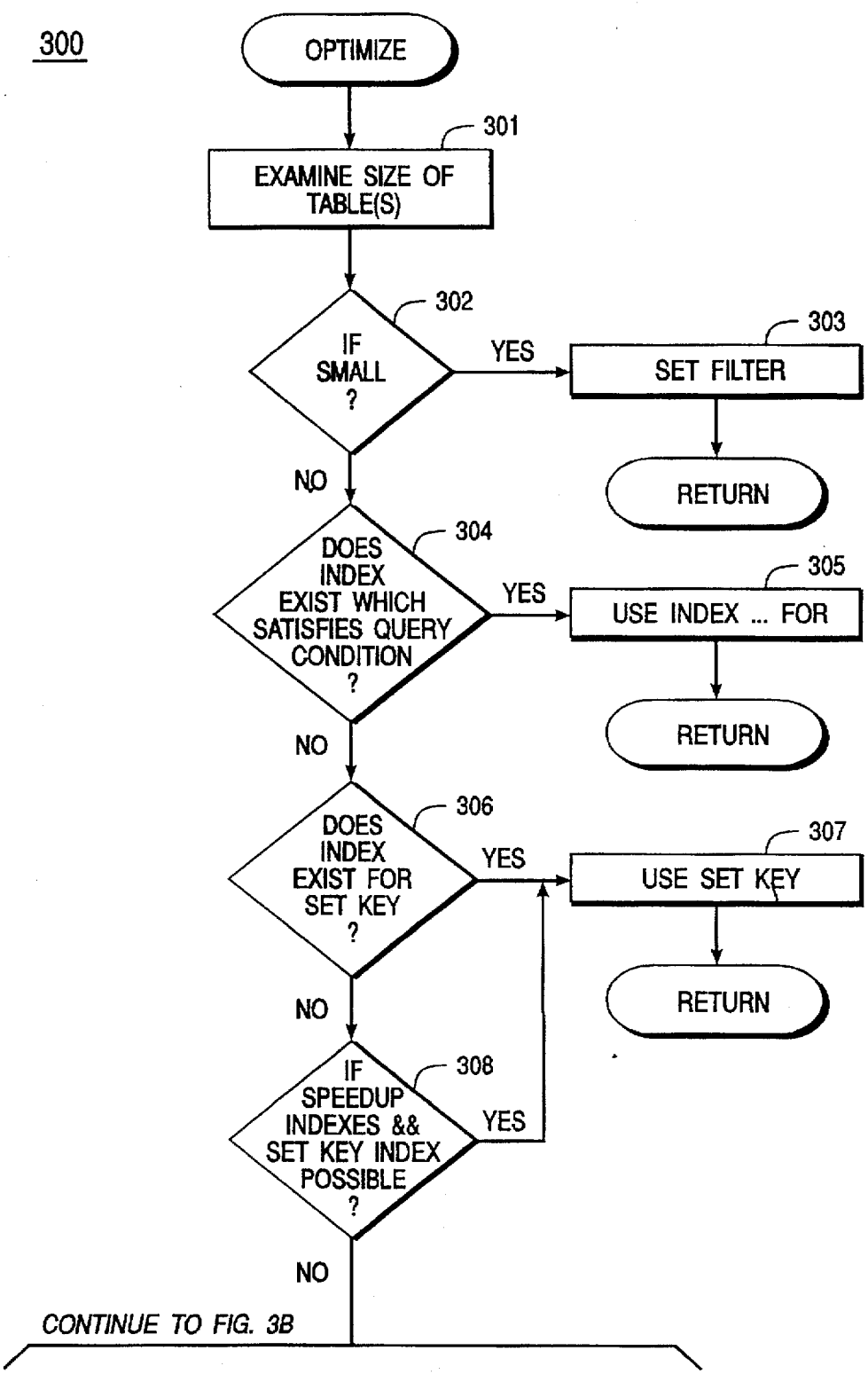
FIGS. 3A–B are a flowchart illustrating an optimization method of the present invention.
Figure 3B:
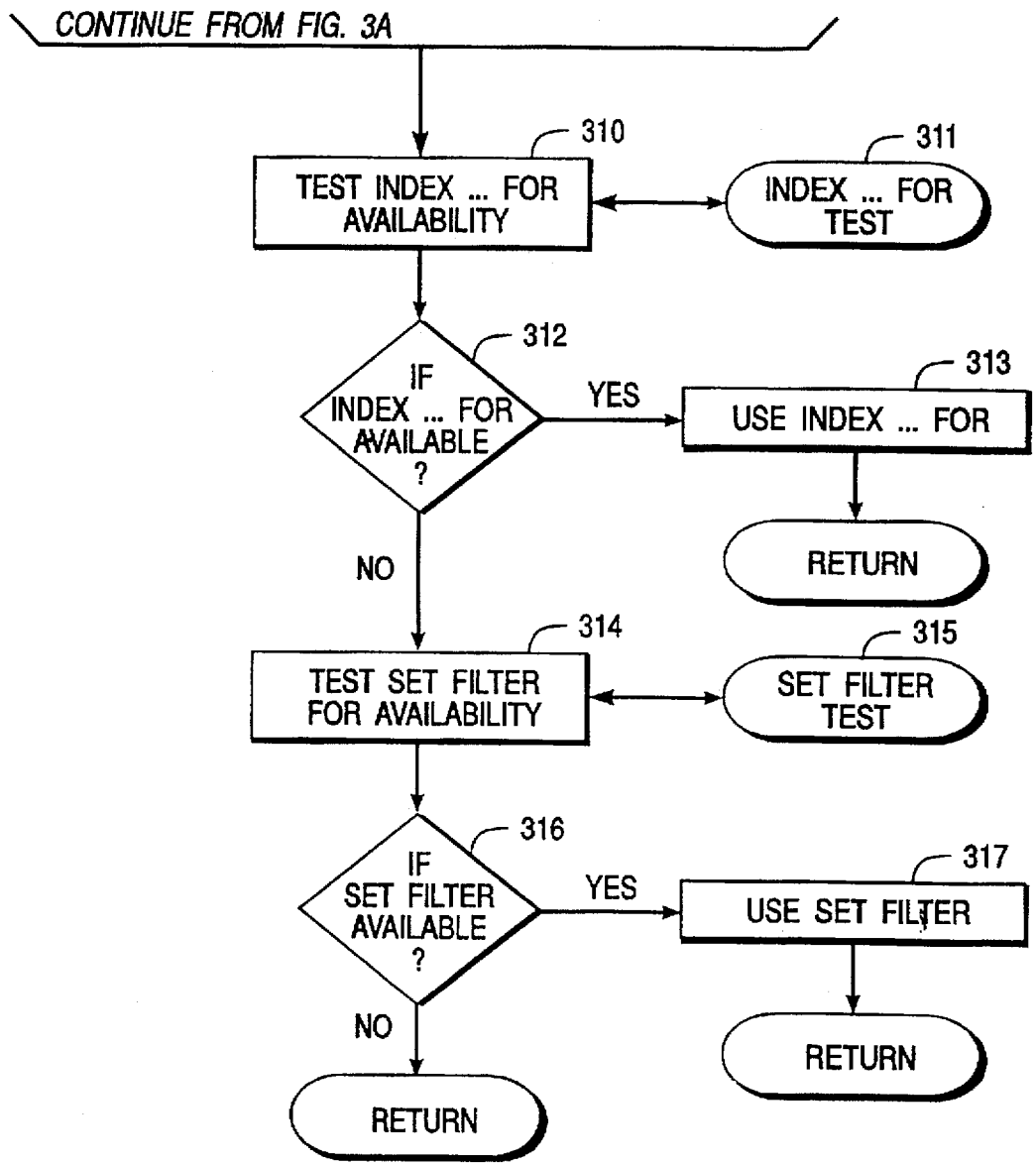

In FIGS. 3A–B, an optimize method 300 of the present invention is illustrated. As set forth above, the method is invoked after the user has specified a query condition. In general, the method examines several conditions and then returns the best (optimal) technique for the current query and system state. As shown, an optimized method 300 of the present invention selects a preferred query or data access technique only after considering various query parameters.

The steps of the method 300 are as follows. In step 301, the size (e.g., number of bytes) of the table is determined; for multitable queries, the size of the parent table (or other desired tables) may be examined. If the size of the table is found to be relatively small in step 302, then the table is simply filtered for the query condition in step 303. Thus, if a table is sufficiently small (e.g., less than 10K), its data will be sufficiently small that it may be loaded and filtered in less time than it would take to build indexes or examine existing indexes for possible use. If the database is not small (no at step 302), then the method proceeds to step 304.

In step 304, the method determines whether an index exists which satisfies the query condition. In this instance, the system may rely on indexes which have been previously built (e.g., by previous queries). In such a case, the query technique is set to use the index, as shown in step 305, and the method returns.

In step 306, the method determines whether a SET KEY index (described hereinabove) exists which may help satisfy the query condition. Again, the system may rely on indexes (in this case, SET KEY indexes) which have been previously built (e.g., by previous queries). In such a case, the query technique is set to use the SET KEY index, as shown in step 307, and the method returns. Alternatively, if previous or speedup indexes have been retained (KEEP SPEEDUP INDEXES) and a SET KEY index may be constructed, at step 308, then the method will employ the SET KEY technique, as shown in step 307.

When KEEP SPEEDUP INDEXES mode is active, newly created index tags are maintained after a query is closed. Thus, the indexes are maintained on the disk and are available for use by subsequent queries. This option speeds up subsequent execution of the query; it also provides the user with an additional technique for creating an index. When the mode is disabled (turned off), however, any indexes created to link or join files, order records by a single field, or the like are discarded. In particular, any new index tags created by the query are only temporary, and are discarded when the query is no longer active. In this instance, disk space is saved and subsequent record updating or the underlying database file is faster (since one less index tag has to be maintained).

For a SET KEY index to be possible, the query for a field of interest should be of the form which would yield a range of records, for example, by using greater than or equal to, or less than or equal to conditions. Examples of conditions which would not be candidates for set key indexes include a query in a character field which employs SOUNDEX matching or wildcard matching. In these cases, a match may result which is non-contiguous (i.e., would not be a range), as desired for a SET KEY index.

If a query technique has not been decided by step 308, then the method continues on to step 310 to test the feasibility of the INDEX . . . FOR technique. As shown in step 311, an INDEX . . . FOR test is invoked. For almost all queries, an INDEX . . . FOR is possible. However, those few instances when an INDEX . . . FOR is not possible should be checked.

Figure 4:
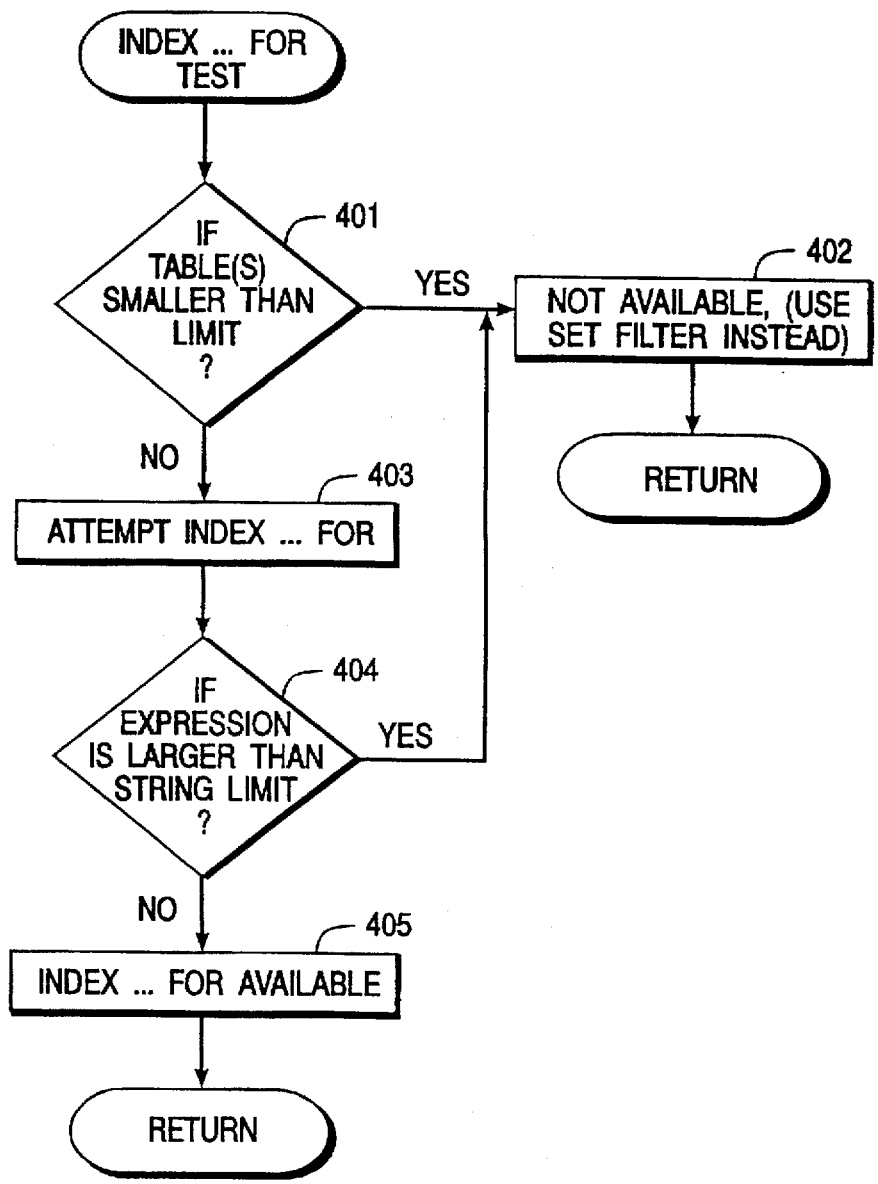
FIG. 4 is a flowchart illustrating an INDEX ... FOR test, which is called from the method of FIG. 3B.

As shown particularly in FIG. 4, the INDEX . . . FOR test includes the following steps. In step 401, if the table is smaller than a second predetermined limit (e.g., on the order of 10K–20K bytes), then the method will select the SET FILTER technique in step 402 for performing the query. Thus, if the table is smaller than a first limit (at step 302 above) then a filtering technique is immediately applied; otherwise, existing indexes are sought. If indexes are not immediately available, then the table is examined against a second size limit. In essence, the filtering technique will be applied but only if faster indexing techniques are not available.

If the table is larger than the preset limit (no at step 401), then an attempt to construct a conditional or filtering index will be made at step 403. If the "FOR" expression (i.e., the filtering condition for the index) is larger than a present string limit (yes at step 401), then an INDEX . . . FOR is not available (fail test). The predetermined string limit will be a function of system resources. For example, a "FOR" or conditional expression of several thousand bytes in length would be computationally inefficient to process on presently available personal computers. Thus, the method of the present invention takes into account limitations of the hardware which may make the choice of certain data access paths undesirable. The length of the expression, however, will typically not approach this limit; in this case (yes at step 404), the INDEX . . . FOR query technique is available (passed test), shown at step 405. In either case (pass or fail), the test results are returned to the method 300, at step 312. If INDEX . . . FOR is determined to be available at step 312, then the method will employ the INDEX . . . FOR query technique at step 313 and then return.

If INDEX . . . FOR is not available (no at step 312), then the method continues on to step 314 to test for the availability of using (i.e., defaulting to) SET FILTER, at step 315. The SET FILTER test determines whether a valid filter may be constructed from the query. As before, the resulting filter construct is tested against a predetermined length to determine if it is feasible (given the limitations of the hardware implementation). At step 316, if set filter is available, then the query method will employ the SET FILTER technique, as shown in step 317. Otherwise (no at step 316), the method returns without having found an optimize technique for executing the query. If desired, user or system feedback of this condition (including an error state or help messages) may be indicated.

Figure 5A:
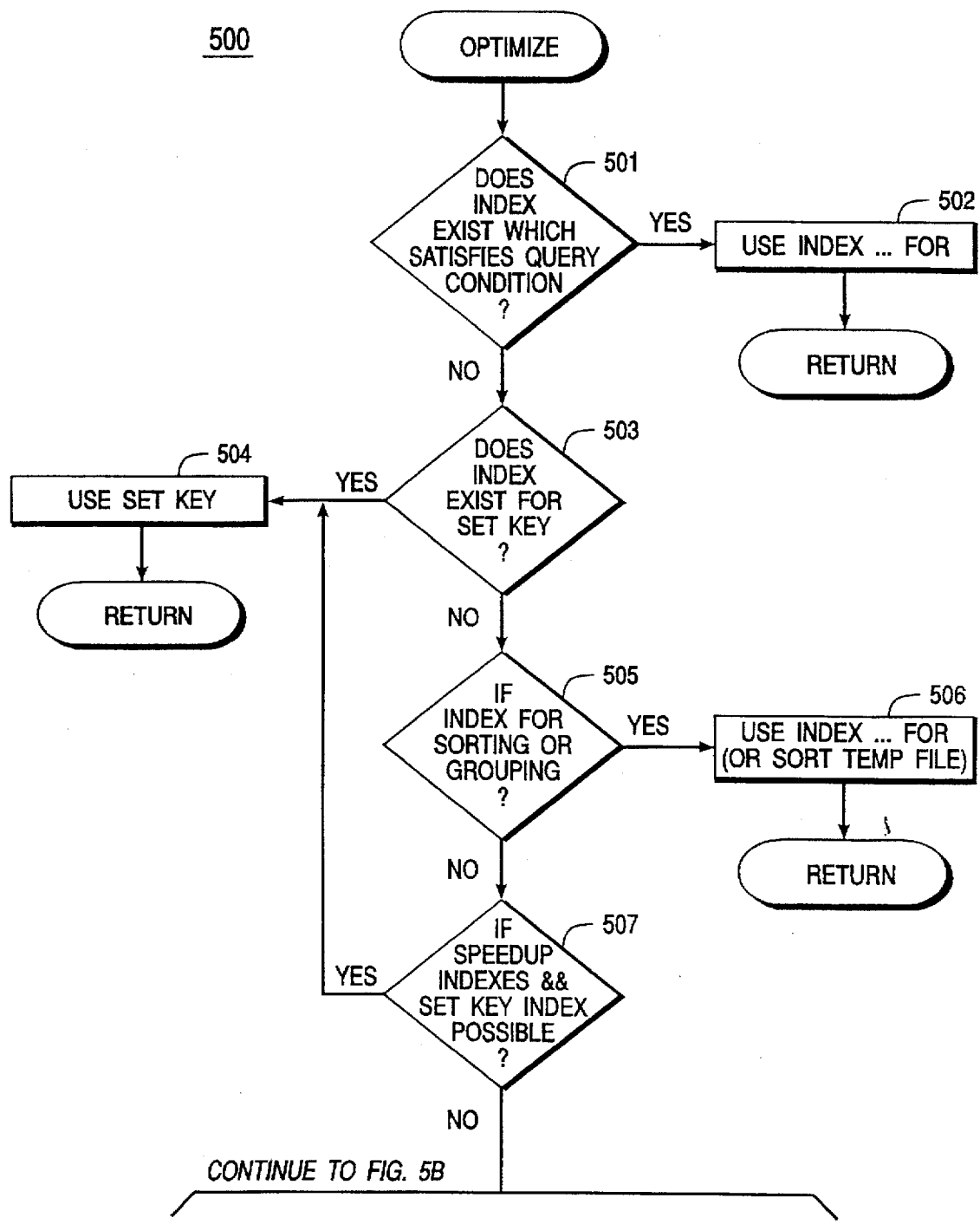
FIGS. 5A–B are a flowchart illustrating a preferred optimization method of the present invention.
Figure 5B:
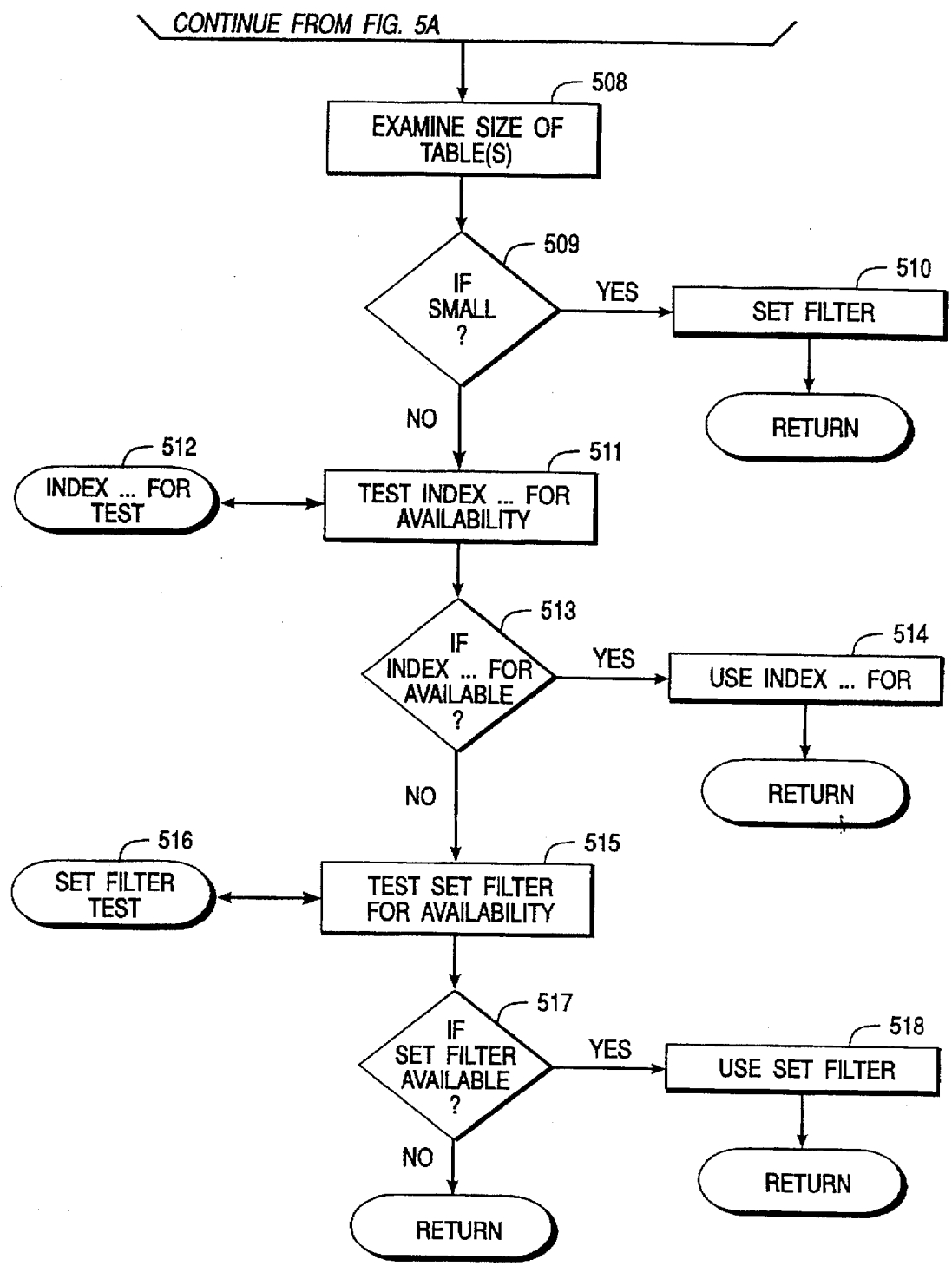

In FIGS. 5A–B, a more preferred embodiment of the method 300 (of FIGS. 3A–B) is illustrated by a flowchart. Optimize method 500 includes many of the steps of method 300. However, method 500 rearranges the order of some of these steps and includes some additional steps.

The operation of method 500 proceeds as follows. In step 501 (corresponding to previous step 304), the method determines whether an index exists which satisfies the query condition. Again, the system may rely on indexes which have been previously built. In such a case, the query technique is set to use the index, as shown in step 502 (corresponding step 305), and the method returns. Continuing on to step 503, the method determines if a SET KEY index exists which may be used (corresponding step 306). If yes, SET KEY data access technique is employed and the method returns, as shown in step 504 (corresponding step 307).

In step 505, a new step is introduced. In particular, step 505 checks whether the user has specified a new sort order or grouping (i.e., arranging records by a common field value). In those instances, the method will employ INDEX ... FOR technique for creating a temporary index satisfying the desired sort order or grouping. Depending on particular system limitations (e.g., mass storage capacity), the method may alternatively create a temporary database file having the particular sort order or grouping. For typical systems, however, the step is generally quicker to perform using indexing technique. In those systems supporting multiple, simultaneous indexes, a temporary index (or sort) may not be required; instead, the specified sorting or grouping is achieve with one of the existing indexes.

If previous or speedup indexes have been retained (KEEP SPEEDUP INDEXES) and a SET KEY index may be constructed at step 507 (corresponding step 308), then the method will employ the SET KEY technique, as shown in step 504 (corresponding step 307). Next, at step 508, the size (e.g., number of bytes) of the table is determined; for multitable queries, the size of the parent table (or other desired tables) may be examined. In a manner similar to corresponding step 302, if the size of the table is found to be relatively small, the table is simply filtered for the query condition in 510 (corresponding to step 303). If the database is not small (no at step 302), then the method proceeds to remaining steps 511–518. These steps essentially perform the same operations as corresponding steps 310–317 (described hereinabove).

Attached hereto is a microfiche Appendix A containing C source code listings, which provide a description of the invention suitable for use in a general purpose digital computer system, such as an IBM-compatible personal computer. A suitable compiler for compiling and linking C code is available from several vendors, include Borland International of Scotts Valley, Calif. Also attached hereto is microfiche Appendix B containing user and programmer guides and additional reference materials providing additional description for the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. A method for optimizing the access of information stored in a database file, the method comprising:

(a) entering a query condition; and (b) accessing information satisfying said query condition by any one of:

(1) if a pre-existing index satisfies the query condition, accessing the information by using the preexisting index;

(2) if an index defining a range of records exists, accessing the information by using the index defining a range of records and the condition;

(3) if at least one pre-existing index is available and if the query condition specifies a range of information, accessing the information by using a second index based on said pre-existing index and said range;

(4) if the database file is below a pre-selected size, accessing the information by filtering records not meeting the condition as they are accessed;

(5) if an index satisfying the query condition can be created, accessing the information by creating and referencing the index;

(6) if the query condition specifies a range of information and if an index defining the range can be created, accessing the information by creating and referencing the index defining the range; and (7) if (1)–(6) are not possible, accessing the information by filtering records not meeting the condition as they are accessed.

2. The method of claim 1, wherein step (a) includes entering a query condition into selected fields of a query form.

3. The method of claim 1, wherein step (a) includes the substep:

if the query condition specifies a grouping or a sort order, and if an index satisfying the grouping or sort order can be created, accessing the information by creating and referencing the index.

4. A method for optimizing the access of information stored in a database file, the method comprising:

(a) entering a query condition; and (b) accessing the specified information by any one of:

(1) referencing an index if one satisfying the query condition exists or can be created;

(2) referencing an index if one defining a range of records exists or can be created; and (3) filtering records not meeting the condition as they are accessed if (1) and (2) are not possible, or if the database file is below a pre-selected size.

5. The method of claim 4, wherein in step (b) an index defining a range of records exists if at least one index is available and if the query condition specifies a range of information referenced by said available at least one index.

6. The method of claim 4, wherein in step (b) an index defining a range of records can be created if the query condition specifies a range of information and an index defining said range can be created.

* * * * *